Feb. 5, 1935.                J. NELSON                1,990,201
                          CLUTCH MECHANISM
                         Filed March 7, 1932        3 Sheets-Sheet 1

Feb. 5, 1935.  J. NELSON  1,990,201

CLUTCH MECHANISM

Filed March 7, 1932  3 Sheets-Sheet 2

Patented Feb. 5, 1935

1,990,201

UNITED STATES PATENT OFFICE 1,990,201

CLUTCH MECHANISM

John Nelson, Rockford, Ill., assignor of one-half to Bengt Granberg, Rockford, Ill.

Application March 7, 1932, Serial No. 597,191

23 Claims. (Cl. 74—59)

This invention relates to clutch means adapted to drive machine tools and other devices of similar characteristics.

An important object of the invention is to provide simple clutch means for driving the carriage or tool of a machine tool wherein the speed or direction of drive may be varied rapidly yet progressively without shock.

I have also aimed to provide a clutch which reduces to a minimum the loss of time between the deceleration at the close of one movement and the acceleration for the beginning of the next movement.

I have also aimed to provide cam clutch mechanism for driving machine tools of such a nature that machines having feed elements with either rotary or straight line movement may be automatically driven in a closed cycle with variable feed positions.

A further object of the invention is to provide improved means for controlling the clutch action.

A still further object of the invention is the provision of a clutch having improved means for rapidly returning a carriage or tool to the starting position.

Other objects and attendant advantages will become apparent to those skilled in the art from the following description of the accompanying drawings, in which—

Fig. 3 is a side view of the rapid return clutch showing the cylinder broken away and the cam developed as though split longitudinally and laid out flat.

Fig. 4 is an end view of the clutch dogs and associated parts;

Figure 1:
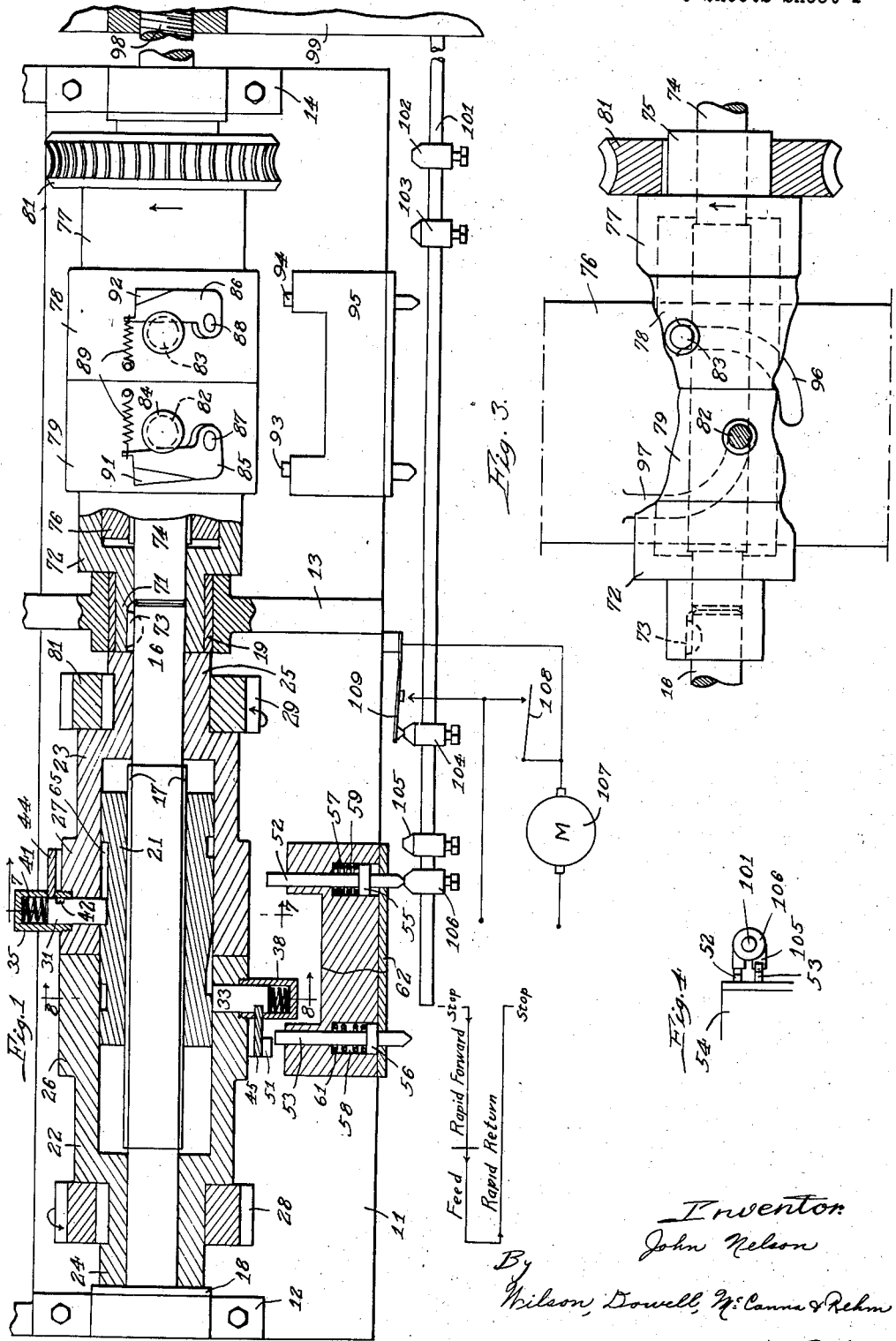
Figure 1 is a showing of the clutch as applied to a machine having a straight line movement, including the means for returning the carriage to the starting position; the clutch being shown partly in section.
Figure 5:
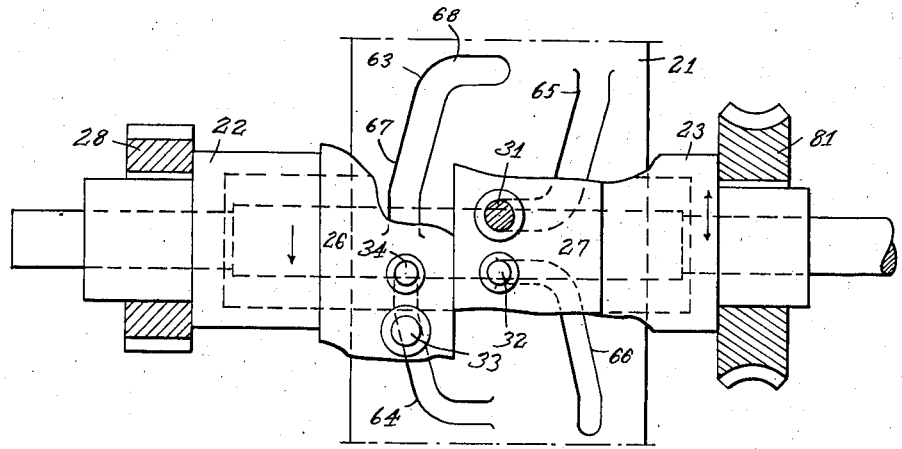
Figure 6:
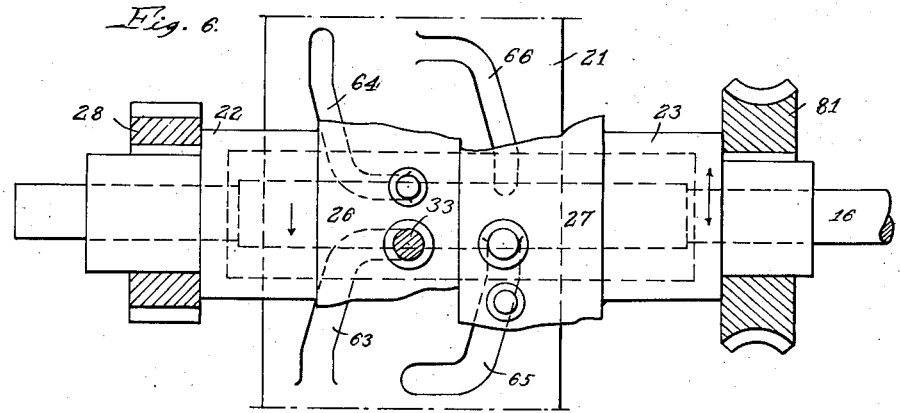
Figure 8:
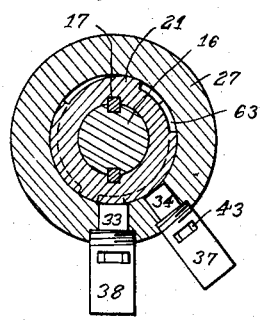
Figure 7:
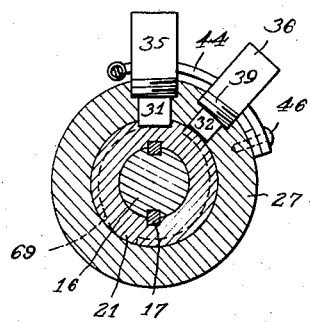

Figs. 5 and 6 are side views of the clutch, partly in section, in which the cylinders have been broken away and the cams developed to show the operation, and Figs. 7 and 8 are sections on the lines 7—7 and 8—8, respectively, of Fig. 1.

The invention contemplates in a general way the provision of clutch mechanism for moving the carriage, or tool, or other part which may constitute the moving or feeding element of a machine tool in rapid approach, feed, and rapid return movements, the mechanism embodying a shaft having a splined sleeve or equivalent construction adapted to be driven by either of a pair of driving members through cam mechanism which serves to rapidly accelerate and decelerate the movement of the shaft and sleeve. These two driving members may advantageously constitute the rapid approach and rapid return drives. The shaft may be provided with a driving member which, together with a feed driving member, drives a second shaft through a splined sleeve and cam mechanism similar to the first, a second shaft being operatively connected to drive the moving element of the machine tool. Thus, the moving element of the machine tool may be selectively driven either from the feed driving member or from the rapid approach or rapid return driving member, the drive in the latter case being through the first mentioned shaft.

Referring first to Figure 1—the numeral 11 designates the frame of the clutch which is provided with suitable walls 12, 13, and 14 for the purpose of supporting various portions of the clutch mechanism. A shaft 16 having splines 17 centrally disposed thereon is rotatably supported in bearings 18 and 19 in the walls 12 and 13. A sleeve 21, presently to be described more in detail, is slidably supported upon the spline portion 17 of the shaft to be capable of moving longitudinally from end to end of this portion. Driving members 22 and 23 are supported on the shaft 16, the members having bearing portions 24 and 25, respectively, rotatably supported upon the ends of the shaft 16 between the splined portion 17 and the bearings 18 and 19, respectively. The driving members are also provided with cylindrical portions 26 and 27 of such inside diameter as to receive the sleeve 21 within relatively close bearing limits. The opposed ends of the cylinders 26 and 27 normally abut each other face to face. Gears 28 and 29 are supported on the bearing portions 24 and 25, respectively, of the driving members 22 and 23. Thus, it is possible to impart rotation to the driving members 22 and 23 by driving the gears 28 and 29 as desired. A pair of cam pins 31 and 32 (Fig. 5) are positioned circumferentially on driving element 23, and a second pair 33 and 34, identical in shape and form with the pins 31 and 32, are positioned in the driving element 22. These pins are positioned to project from the inner surface of the cylindrical portions 26 and 27 and have longitudinal movement in the cylinders. Caps 35, 36, 37 and 38 are positioned over the outer ends of the cam pins and have threaded engagement with the cylinders as shown at 39. Each of the caps contains a coiled spring 41 which acts between the top of the cap and the upper end of the cam pin to normally urge the cam pin inward. Each of the cam pins is provided with a slot 42 in one side which is positioned to coincide with openings 43 in the caps, the slots being shaped to receive the edges of levers 44 and 45 which serve to hold the pins in their outer position against the action of the springs 41. The levers 44 and 45 are pivotally secured to the driving members at 46 and 47, respectively, and are provided with springs 48 which tend to urge the edges of the levers into contact with the pins. The levers are provided with upstanding cam surfaces 49 and 51 shaped and positioned to come into contact with rods 52 and 53 during the rotation of the driving members to withdraw the levers 44 and 45 from contact with the cam pins to permit them to be urged inward under the action of the springs 41. The rods 52 and 53 are supported in a bracket 54 attached to the frame 11 and are longitudinally movable therein. The rods are provided with collars 55 and 56 in chambers 57 and 58, springs 59 and 61 normally urging the collars 55 and 56 into contact with a plate 62 on the side of the bracket 54. The springs 59 and 61 thus normally maintain the rods 52 and 53 out of contact with the levers 44 and 45 but permit them to be moved so as to establish operative relationship therewith.

Referring now more particularly to Figs. 5 and 6, I have shown in detail the cam means for selectively connecting the driving members 22 and 23 to the sleeve 21 to drive the shaft 16. This includes two sets of cam grooves, designated generally by the numerals 63, 64, 65, and 66, respectively. The grooves 63 and 65 are of the same width as the diameter of the pins 31 and 33 while the grooves 64 and 66 are of lesser width than the diameter of the pins 31 and 33 but of the same width as the diameter of the pins 32 and 34. Each of the grooves is provided with a gradually sloping portion 67 extending diagonally along the surface of the sleeve and a portion 68 extending longitudinally of the sleeve. One end of each cam groove is sloped, as shown at 69 in Fig. 7, so that the bottom of the cam groove gradually approaches the plane of the surface so that a cam pin moved therein will be forced out by the inclined bottom. In Fig. 5 I have shown the relative positions of the parts when the sleeve and shaft are being driven by the driving member 23, the cam pin 31 being inserted in the cam groove 65. In this position, rotary motion will be transmitted from the driving member 23 to the sleeve 21 and consequently to the shaft 16 through the pin 31 which rests within the groove 65 against the side walls of the longitudinal portions 68. This driving will continue until the sleeve 21 is moved so that the cam pin 31 will pass around the bend in the groove. This is accomplished by moving the rod 53 inward to engage the cam surface 51 moving the lever 45 to the left, facing the figures. At this point, the cam pins 33 and 34 will be released so that the lower ends of these pins will be urged into contact with the surface of the sleeve by the springs 41. Assuming that the pins 33 and 34 are released when the parts occupy the position shown in Fig. 5, the pins 33 and 34 will then move along the surface of the sleeve in the direction indicated by the arrow. The cam pin 33 will pass over the cam groove 64 since the groove is not of sufficient width to receive the pin. However, the pin 34 will enter the groove 64 and as the parts continue to move will cause the sleeve 21 to be moved toward the left, facing Figure 1. This longitudinal movement of the sleeve will continue until the opposite driving cam pin 31 moves along the sloping portion 67 of the groove 65. When the cam pin 34 reaches the portion 68 the cam pin 33 will have reached a position to drop into the longitudinal portion of the cam groove 63. At the same time, the pin 31 emerging from the groove 65 will cause the pins 33 and 34 to move to the ends of the longitudinal portions 68 of the grooves 63 and 64. Driving relation is thus established between the driving element 22 and the sleeve 21 and the driving element 23 is simultaneously disengaged from its driving connection with the sleeve. As the pin 34 reaches the end of the longitudinal portion of the groove 64 the sloping bottom of the groove forces the pin 34 upwardly to a point where the edge of the lever 45 drops into the slot 42 thereof and holds it against being further inserted should it at some future time coincide with either the groove 63 or 64. The levers 44 and 45 are supported in such a position as to be capable of entering the slots 42 of the pins 32 and 34 while the driving cam pins 31 and 33 are inserted. Fig. 6 shows the relative positions of the parts when the driving cam pin 33 has reached its driving position and the cam pin 34 has been forced out of the grooves by the sloping bottom. When the driving member 23 is moving in a direction opposite to that of the driving member 22 the operation of the mechanism is identical with that just described.

However, the clutch may be employed with both of the driving elements rotating in the same direction. Thus, the driving element 23 may rotate in either direction, as indicated by the arrows. When the driving element 23 rotates in the same direction as the driving element 22 it is necessary for the satisfactory operation of the clutch that the driving member 22 rotate at a greater rate of speed than the member 23. In this case, it will be seen that upon insertion of the cam pins 31 and 32 the relative movement of the driving member 23 and the sleeve 21 will be the same as though the driving members were rotating in opposite directions.

One end of the shaft 16 is receivable in the bearing portion 71 of a third driving member 72 which I shall designate as a driving element, the bearing portion 71 of the element being supported in the bearing 19 and the shaft 16 being keyed thereto by means of a key 73. A second shaft 74 also has one ends supported in the bearing portion 71, the opposite end thereof being supported in a bearing 75 in the frame wall 14 for rotation. A second sleeve 76 is splined to the shaft 74 for longitudinal movement thereon, the sleeve you will see resembling the sleeve 21. A second driving element 77 is rotatably supported upon the shaft 74 and is provided with a cylindrical portion 78 which, together with the cylindrical portion 79 of the driving element 72, encloses the second sleeve 76. The shaft 74 has free rotation in the bearing portion 71 so that it may be rotated directly from the driving element 77 by means of a gear 81 mounted thereon. Driving pins 82 and 83 are slidably positioned in the driving elements 72 and 77, respectively, and are provided with caps 84 which serve to enclose the cam pins 82 and 83 and contain springs for the operation thereof, their operation and construction being substantially similar to those on the driving members 22 and 23. Levers 85 and 86 are pivotally supported at 87 and 88 so that they may be moved about these points to cause their edges to engage or disengage the slots 42 in the cam pins 82 and 83. Springs 89 serve to normally maintain the levers with their edges in contact with the cam pins. Upwardly projecting flanges 91 and 92 on the levers 85 and 86 are adapted to be engaged by rods 93 and 94 slidably positioned in a bracket 95 secured to the frame 11 for the purpose of rotating the levers and releasing the cam pins as desired. The bracket 95 is identical in construction with the bracket 54 and the pins 93 and 94 are identical with the pins 52 and 53, the spring means also serving to normally maintain these pins in a retracted position.

The sleeve 76 is provided with two arcuate cam grooves 96 and 97 of sufficient width to receive the cam pins 82 and 83 when the latch levers 85 and 86 are actuated. Thus, in Fig. 3, the driving elements and cam pins are shown in a position such that the drive will be transmitted from the shaft 16 through the driving element 72, the sleeve 76 and the shaft 74. It will be seen that the cam groove 96 and cam pin 83 are in a position such that when the cam pin 83 is released it will follow along the cam groove 96, thereby moving the sleeve 76 to the right, facing the figure. When the cam pin 82 reaches the opposite end of the groove 97 a sloping bottom of this groove will cause the pin to be forced outward to a position in which the lever 85 will engage the slot in the pin and hold it from further downward movement. The drive will then be transmitted from the gear 81 through the driving element 77, the cam pin 83, the sleeve 76 and the shaft 74. Thus, insertion of either of the cam pins 82 or 83 causes the engagement of one of the driving elements and the simultaneous disengagement of the other.

The clutch unit first described, consisting of the shaft 16, sleeve 21, and driving members 22 and 23 may be replaced by the clutch shown in my copending Patent No. 1,889,998, Dec. 6, 1932, and is particularly well suited for work where an arcuate stop is required.

As a result of the structure just described, it will be seen that three separate movements may be transmitted to the shaft 74. It may be driven directly from the gear 81 through the driving elements 77, the cam pin 83, and the sleeve 76. Secondly, it may be driven from the gear 28 through the cam pin 33, the sleeve 21, the shaft 16, the driving element 72, the cam pin 82 and the sleeve 76. Thirdly, it may be driven from the gear 29 through the driving element 23, the cam pin 31, the sleeve 21, shaft 16, driving element 72, cam pin 82 and sleeve 76. In Figure 1, I have shown the shaft 74 as being threaded, as shown at 98, to move a carriage 99 of a machine tool through the clutch as described. The carriage 99 may then be given three separate movements, these movements advantageously being rapid approach movement to the tool, or work, feed movement, and rapid return movement to the starting position. In order to carry out these movements in response to the movement of the carriage, I have shown a bar 101 for carrying a plurality of dogs 102, 103, 104, 105, and 106, for actuating the rods 52, 53, 93, and 94, this construction being, of course, diagrammatic in nature for the purpose of better illustrating the operation of the mechanism. The dog 104 is a part of switch mechanism diagrammatically shown for completeness which serves to start and stop the machine. A motor 107 drives the gear 28, 29 and 81 at desired rates of speed and is adapted to be started through normal closing of a switch 108 momentarily. Movement of the rod 101 will carry the dog 104 from under the spring switch element 109 permitting the circuit through the motor to be closed at this point. When the mechanism completes its cycle the dog 104 will again move into a position to lift the switch element 109 and open the switch to stop the motor.

Assuming the parts occupy the positions shown in Figures 1, 3, and 5, and the switch 108 is closed, the carriage 99 will be driven from the gear 29 in rapid approach movement. During this movement the bar 101 will move to the left facing Figure 1. The carriage will continue in rapid approach movement until the dog 102 strikes the rod 94, inserting the same and releasing cam pin 83, which enters the groove 96, disengaging driving element 72 and engaging driving element 77. The carriage 99 will now be driven in feed movement by the gear 81. The dog 105 is so positioned on the bar 101 that it will come into contact with the rod 53 sometime during the feed movement, but before the close thereof in order to reverse the motion of the driving element 72. This is accomplished by inserting the cam pins 33 and 34 to engage the driving member 22 and disengage the member 23.

At the close of the feed movement the dog 103 comes into contact with the rod 93 inserting the cam pin 82 to engage the driving element 72 and disengage the element 77. The direction of travel of the carriage 99 will be reversed, the carriage being driven by the gear 28. When the dog 106 again comes into contact with the rod 52 the driving member 23 will be reengaged to reverse the movement of the carriage 99 and the switch 109 will simultaneously be opened to complete one cycle and stop the mechanism. Obviously, the switch may be arranged to stop the mechanism after any number of cycles or it may be regulated in any way. It will be seen that the position of the dogs on the bar 101 may be varied to regulate the length of the various movements as desired.

Figure 2:
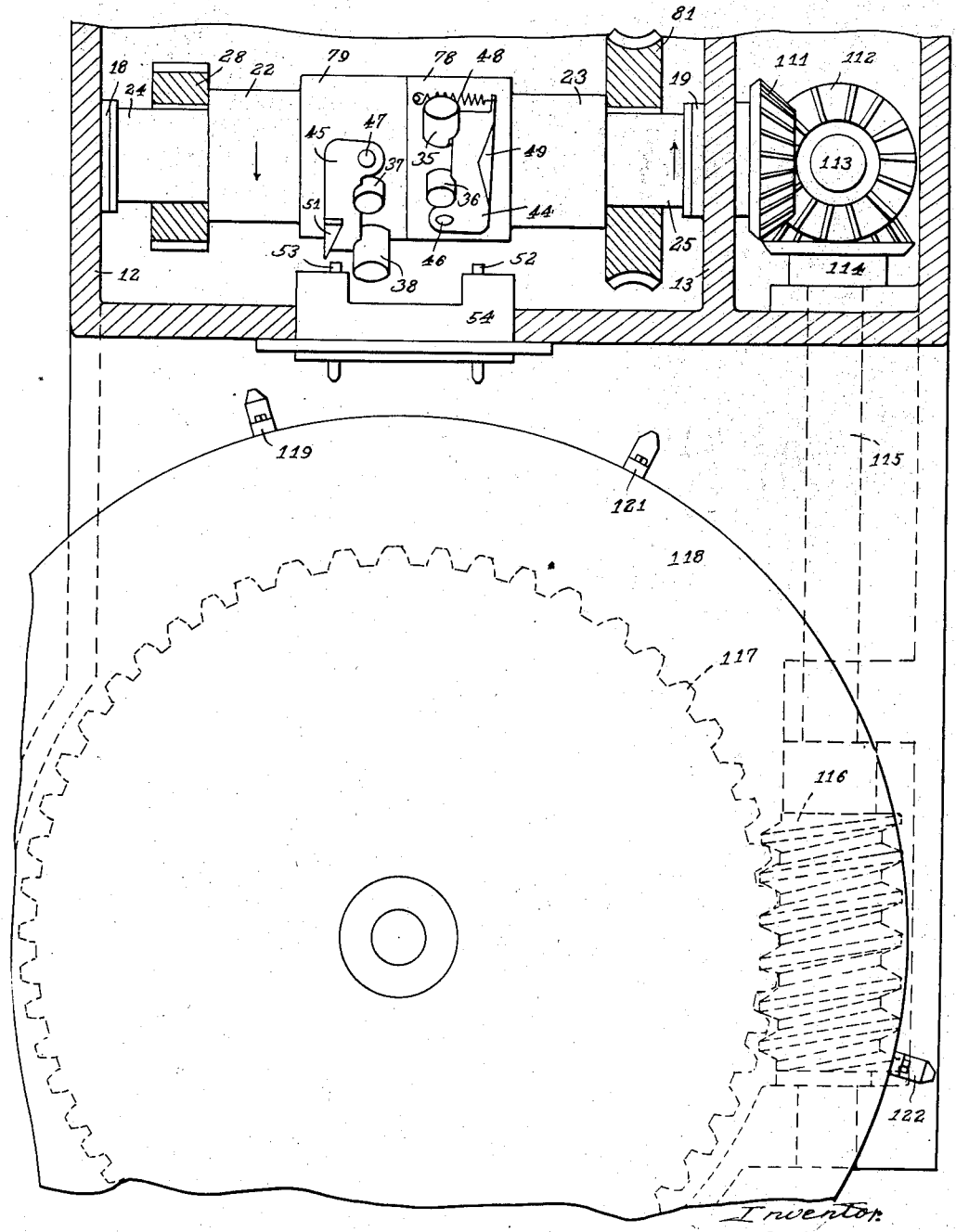
Fig. 2 is a showing more or less diagrammatically of the clutch as employed on a machine having a rotary table, the clutch being shown in elevation.

Referring now more particularly to Figure 2, I have shown a simplified construction for use with machines having rotary tables or the like. Under these circumstances a rapid return movement is not necessary since the table moves continually forward. Consequently, it is possible to replace the gear 29 of Figure 1 by the gear 81 and so eliminate all of the parts to the right of the wall 13 of this figure. In other words, the second shaft, sleeve and driving elements may be eliminated. In this instance, I have shown a bevel gear 111 on the end of the shaft 16 positioned to engage a bevel gear 112 on a shaft 113. A second bevel gear on this shaft engages a gear 114 on a shaft 115. A worm 116 on the shaft 115 meshes with a worm gear 117 on the table 118 of a machine tool or other machine to be driven by the clutch. Dogs 119, 121, and 122, on the periphery of the table 118 serve to actuate the rods 52 and 53, the dogs 119 and 122 being in a plane to engage the rod 53 and the dog 121 to engage the rod 52. The dogs are spaced to alternately actuate the rods 53 and 52 at suitable intervals to cause one of the driving members to be engaged and the other simultaneously disengaged from the shaft 16 thereby driving the table from either the gear 28 or 81. Under these circumstances, it will be observed that both of the driving members are rotating in the same direction. However, the feed gear 81 will rotate at a considerably lower rate of speed than the gear 28 so that the cam means for connecting the driving elements is properly operative.

Attention is directed to the fact that there is substantially no lapse of time between the close of the deceleration of the shaft 16 and the point at which accleration thereof begins. This is a matter of particular importance since in certain prior constructions sufficient time elapses to render the operation of the clutch slow for certain types of high speed work. When the two driving elements are operating in the same direction there is merely a gradual transition from the higher to the lower speed.

Attention is also directed to the fact that I have provided a cam control wherein the complete cycle of approach, feed, and return are cam controlled, but in which the length of each movement of the cycle may be varied and in which, regardless of the variation, the carriage is gradually but rapidly accelerated and decelerated.

I have also provided means for controlling the cam pins whereby separate latch mechanism for the pins of each set is eliminated.

While I have thus described and illustrated a specific embodiment of my invention I am aware that numerous alterations and changes may be made therein without departing from the spirit of the invention and I do not wish to be limited except as required by the prior art.

I claim:

1. A clutch comprising in combination a rotatable splined shaft, a splined sleeve on said shaft having cam surfaces, a pair of rotatable members adapted to selectively have driving connection with said sleeve, and means acting between each of said members and said sleeve, the actuation of which means causes the disengagement of one of said members.

2. A clutch comprising in combination a rotatable splined shaft, a splined sleeve on said shaft having cam surfaces, a pair of rotatable members adapted to selectively have driving connection with said sleeve, and means acting between each of said members and said sleeve, the actuation of which means causes the disengagement of one of said members, and the engagement of the other.

3. A clutch comprising in combination a rotatable splined shaft, a splined sleeve on said shaft having cam surfaces, a pair of rotatable cylindrical members at least partially enclosing said sleeve, and means on each of said members cooperable with said cam surface for engaging said sleeve and one of said members and disengaging the other.

4. A clutch comprising in combination a rotatable splined shaft, a splined sleeve on said shaft having cam surfaces, a pair of rotatable members positioned for selective driving connection with said sleeve, and cam pins on said members selectively engageable with said cam surfaces to engage one of said members and disengage the other.

5. A clutch comprising in combination a rotatable splined shaft, a splined sleeve on said shaft having two sets of cam surfaces, a pair of rotatable members positioned for selective driving connection with said sleeve, and a pair of cam pins on each of said members, each pair being engageable with one set of cam surfaces to engage one of said members and disengage the other.

6. A clutch as set forth in claim 5 having spring means for moving said pins, and means for normally holding them against such movement.

7. In a clutch adapted to drive the movable element of a machine tool, a driven shaft operatively connected to said element to drive the same, at least two driving members, an intermediate member operatively connected to said shaft, and cam means operable between said intermediate member and said driving members to simultaneously engage one of said driving members with said intermediate member and disengage the other.

8. A clutch as set forth in claim 7 having means responsive to the movement of said movable element for actuating said cam means.

9. In a clutch adapted to drive the movable elements of a machine tool, at least two driven shafts one of which is connected to drive said movable element, a sleeve splined to each shaft, a pair of driving members for driving each shaft, cam means constituting driving connections between said driving members and their sleeves for selectively establishing driving connection therebetween, and means for connecting one of said shafts with one of the driving members for the other shaft to effect a driving connection therethrough whereby said last mentioned shaft may be driven from any of three independent driving elements.

10. A clutch as set forth in claim 9 having means for actuating said cam means in response to the movement of said movable element.

11. A cam clutch, a pair of cam clutch units, each having a driven shaft, a sleeve on said shaft having driving engagement therewith, a pair of driving members, and cam means operable between either of said driving members to drive said shaft, and means for connecting the driven shaft of one of said units to one of the driving members of the other unit whereby the driven shaft of the latter unit may be driven from any of three driving members.

12. In a clutch adapted to drive the movable element of a machine tool, a driven shaft operatively connected to said element to drive the same through a second shaft, at least two driving members associated with said driven shaft, a member intermediate said driving members and said driven shaft operatively connected with the latter, cam means operable between said driving members and said intermediate member to establish driving connection between the intermediate member and either of said driving members, at least two driving elements associated with said second shaft one of said driving elements being connected to said driven shaft, a second intermediate member, and cam means for connecting either of said driving elements to said second shaft whereby said second shaft may be selectively driven from either of said driving members through said driving shaft or from the other of said driving elements.

13. In a clutch adapted to drive the rotary table of a machine tool, a driven shaft connected to drive said table, an intermediate member having driving connection with said shaft, a driving member arranged for rotation at a speed to drive said table at rapid approaching speed, a driving member arranged for rotation at a speed to drive said table in feed movement, cam means forming part of the clutch and operable to connect either of said driving members with said intermediate member with rapid acceleration and deceleration movements, and means on said table to actuate said cam means to alternately connect said driving members, whereby to alternatively drive said table in rapid approach and feed movements.

14. In a clutch having a driven shaft and a plurality of driving members, means for driving said shaft from either of said driving members comprising a sleeve splined to said shaft having pairs of curved cam grooves equal in number to said driving members, and a pair of cam pins on each of said driving members insertable in said cam grooves to establish driving connection between one of said driving members and said sleeve and disengage the other.

15. In a clutch having a driven shaft and a plurality of driving members, means for driving said shaft from either of said driving members comprising a sleeve splined to said shaft having pairs of curved cam grooves equal in number to said driving members, and a cam driving pin and a cam advancing pin on each of said driving members, insertable in said cam grooves, said cam advancing pin serving to move said sleeve to a position to disengage the driving pin on the opposite driving member and to engage the driving pin on the same driving member, thereby disenagaging one driving member and engaging the other.

16. In a cam clutch having two rotatable elements, at least one longitudinally shiftable cam pin on one of said elements adapted to engage and establish connection with the other of said elements, spring means to urge said pin to its engaging relation, cam means on said other element to shift and disengage said pin, and a normally effective latch mounted on said one of the elements and operable to maintain said pin in its disconnected relation.

17. A cam clutch comprising two rotatable elements, at least one longitudinally shiftable cam pin mounted on one of said elements and adapted to engage and establish connection with the other element, spring means urging said pin to its engaged relation, means to retract said pin, a normally effective latch mounted on said one of said elements and operable to maintain said pin in its disengaged relation, and means operable to release said latch during rotation of the element on which it is mounted.

18. A feed-traverse clutch comprising a first driving member rotated in a forward driving direction at feeding speed, a second driving member adapted for rotation in forward and return directions at rapid traverse speeds, a driven element, a first pin and cam slot means operable to establish driving connection between said first member and said element, and a second pin and cam slot means operable to establish driving connection between said second member and said element, said second means being operable when actuated during return rotation of said second driving member and when the feed drive is engaged to disengage the feed drive formed by said first means and engage said second means to cause rapid return rotation of said element, and said first means being operable when actuated during rapid forward rotation of said second driving member and said element to disengage the rapid forward drive formed by said second means and engage said first means to cause forward rotation of the element at feeding speed.

19. A reversing clutch comprising first and second reversely rotated driving members, a driven element, a first cam slot and pin means for establishing in succession a yielding rotational driving connection and a positive rotational driving connection between said first driving member and said element, a second cam slot and pin means for establishing in succession a yielding rotational driving connection and a positive rotational driving connection between said second driving member and said element, said first means when actuated to establish connection between said first member and said element being operable during its yielding connection to disengage the positive driving connection and reestablish the yielding driving connection of said second means, and said last mentioned yielding driving connection of said second means being operable to establish the positive driving connection of said first means.

20. A reversing clutch comprising a first rotatable driving member, a second reversely rotated driving member, a coaxial driven element, a first means for establishing in succession a yielding rotational driving connection and a positive rotational driving connection between said first driving member and said element, a second means for establishing in succession a yielding rotational driving connection and a positive rotational driving connection between said second driving member and said element, said first means when actuated to establish connection between said first member and said element being operable during its yielding connection with the element to disengage the positive driving connection and reestablish the yielding driving connection of said second means, and said last mentioned yielding driving connection of said second means being operable to establish the positive driving connection of said first means.

21. A reversing clutch comprising first and second reversely rotated driving members, a driven element, a first means operable to establish at different times between said first member and said element a yielding driving connection and a positive driving connection, and a second means operable to establish at different times between said second member and said element a yielding driving connection and a positive driving connection, each of said means when acting in its yielding driving connection being operable to control the relation of the positive driving connection of the other of said means.

22. A reversing clutch comprising a pair of oppositely rotating driving members and a driven element mounted in coaxial relation, means for selectively engaging said members with said element for positive driving connection, and means acting between each of said driving members and said driven element and operable selectively to disengage the positive drive between the other member and said element and gradually apply decelerating force to said element.

23. A reversing clutch comprising a pair of oppositely rotating driving members and a driven element mounted in coaxial relation, means for selectively engaging said members with said element in positive driving relation thereto, and means acting between said element and either of said driving members and operable selectively to disengage the positive driving relation between said element and the other member and apply a gradual decelerating force to said element followed by a gradual accelerating force in the opposite direction.

JOHN NELSON.